(12) United States Patent
Ijzerman et al.

(10) Patent No.: US 7,959,343 B2
(45) Date of Patent: Jun. 14, 2011

(54) ILLUMINATION SYSTEM FOR LUMINAIRES AND DISPLAY DEVICES

(75) Inventors: Willem L. Ijzerman, Eindhoven (NL); Hugo J. Cornelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 97 days.

(21) Appl. No.: 12/377,667

(22) PCT Filed: Sep. 13, 2007

(86) PCT No.: PCT/IB2007/053699
§ 371 (c)(1),
(2), (4) Date: Feb. 16, 2009

(87) PCT Pub. No.: WO2008/035256
PCT Pub. Date: Mar. 27, 2008

(65) Prior Publication Data
US 2010/0172153 A1 Jul. 8, 2010

(30) Foreign Application Priority Data
Sep. 19, 2006 (EP) .................................. 06120897

(51) Int. Cl.
*F21V 7/04* (2006.01)
(52) U.S. Cl. ..................... 362/625; 362/97.1; 362/97.3
(58) Field of Classification Search .................. 362/84, 362/230, 231, 26, 327, 328, 330, 336, 337, 362/600, 606–615, 620, 624–627, 23, 24, 362/29, 30, 85, 88, 97.1, 97.3, 224, 237, 362/240, 241, 245, 246, 555, 561, 628, 629, 362/800, 806, 812; 349/61, 62, 64, 65, 68
See application file for complete search history.

(56) References Cited

U.S. PATENT DOCUMENTS
4,714,983 A * 12/1987 Lang ................................ 362/27
5,249,104 A * 9/1993 Mizobe ......................... 362/605
(Continued)

FOREIGN PATENT DOCUMENTS
JP 2000113709 A 4/2000
(Continued)

*Primary Examiner* — Hargobind S Sawhney
(74) *Attorney, Agent, or Firm* — John F. Salazar; Mark L. Beloborodov

(57) ABSTRACT

The invention relates to an illumination system (4) comprising at least one light source (10) for emitting light of a predominant wavelength (W), and a light-transmitting panel (14) which comprises a light-emitting window (16), a rear wall (18) situated opposite said light-emitting window, and edge walls (20) extending between the light-emitting window and the rear wall. Light from the LED is coupled into the light-transmitting panel and is transported substantially via total internal reflection. The rear wall is provided with a two-dimensional array of recesses (22, 24). A sub-set of recesses (22) is distributed substantially regularly on the rear wall. Each recess (22A, 22B, 22C) from the sub-set (22) comprises scattering material (26). When light from the light-transmitting panel reaches the scattering material of the recess, part of the light (W') is coupled out of the light-transmitting panel via scattering. The regular distribution of the scattering material on the rear wall improves the uniformity of the light emitted via the light-emitting window. In an embodiment of the illumination system, the scattering material comprises a luminescent material (28), which absorbs light of the predominant wavelength (UV) and emits light of a further predominant wavelength (R, G, B).

5 Claims, 7 Drawing Sheets

U.S. PATENT DOCUMENTS

| | | | |
|---|---|---|---|
| 6,883,950 B2 * | 4/2005 | Adachi et al. | 362/555 |
| 6,964,497 B2 * | 11/2005 | Greiner | 362/241 |
| 7,129,103 B2 * | 10/2006 | Tanaka | 438/22 |
| 7,195,364 B2 * | 3/2007 | Hahm et al. | 362/27 |
| 7,222,993 B2 * | 5/2007 | Kikuchi et al. | 362/300 |
| 7,441,931 B2 * | 10/2008 | Bayersdorfer et al. | 362/489 |
| 2002/0097578 A1 | 7/2002 | Greiner | |
| 2004/0130515 A1 | 7/2004 | Chuang et al. | |
| 2004/0149998 A1 | 8/2004 | Henson et al. | |
| 2006/0087866 A1 | 4/2006 | Ng et al. | |
| 2008/0055931 A1 * | 3/2008 | Verstraete et al. | 362/612 |

FOREIGN PATENT DOCUMENTS

| | | | |
|---|---|---|---|
| JP | 2001143519 A | * | 5/2001 |
| KR | 102006012713 A | * | 2/2006 |
| KR | 1020010046581 A | * | 6/2006 |

* cited by examiner

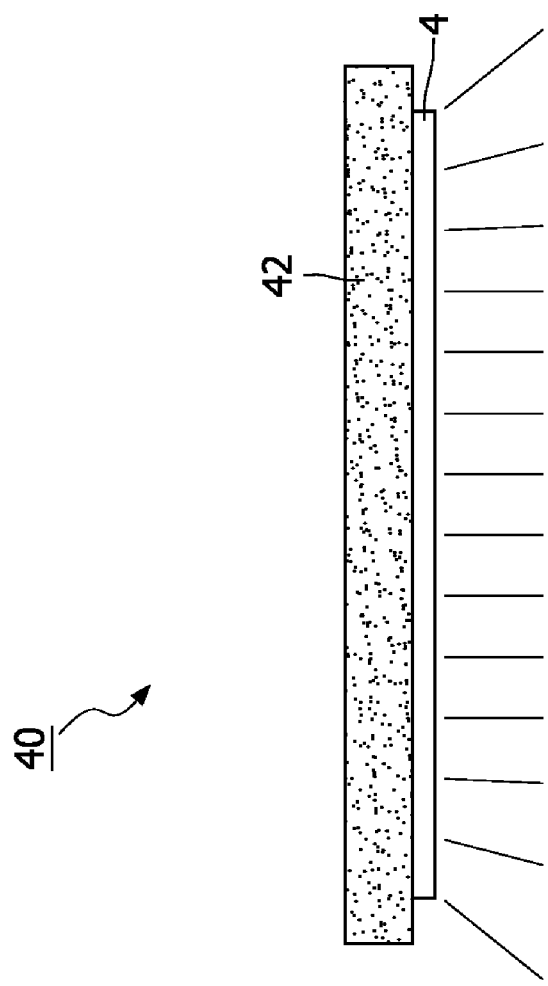
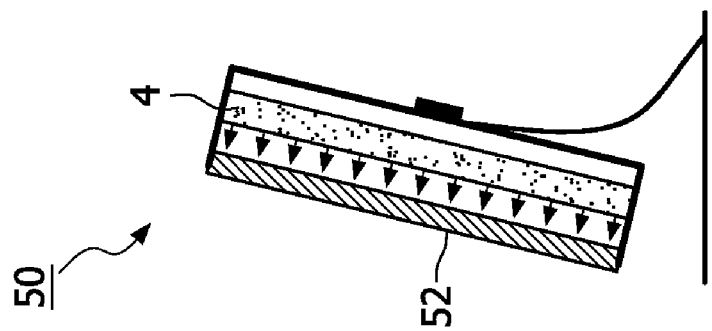

ILLUMINATION SYSTEM FOR LUMINAIRES AND DISPLAY DEVICES

This application is a national stage application under 35 U.S.C. §371 of International Application No. PCT/IB2007/053699 filed on Sep. 13, 2007, and published in the English language on Mar. 27, 2008 as International Publication No. WO/2008/035256, which claims priority to European Application No. 06120897.1 filed on Sep. 19, 2006, incorporated herein by reference.

FIELD OF THE INVENTION

The invention relates to an illumination system comprising a light source and a light-transmitting panel comprising a light-emitting window, a rear wall situated opposite said light-emitting window, and edge walls extending between the light-emitting window and the rear wall.

The invention also relates to a luminaire and a display device.

BACKGROUND OF THE INVENTION

Such illumination systems are known per se. They are used, inter alia, as luminaires for general lighting purposes, for example, for office lighting or shop lighting, for example, shop-window lighting or lighting of (transparent or semi-transparent) plates of glass or of (transparent) synthetic resin on which, for example, jewelry is displayed. An alternative application is the use of such systems for illuminating billboards.

Such known illumination systems are also used as backlight-emitting panels in (picture) display devices, for example, for TV sets and monitors. These systems are particularly suitable for use as backlights for non-emissive displays such as liquid crystal display devices, also referred to as LCD panels, which are used in (portable) computers or (portable) telephones.

These display devices usually comprise a substrate provided with a regular pattern of pixels, each of which is controlled by at least one electrode. The display device utilizes a control circuit for achieving a picture or a data-graphical display in a relevant field of a (picture) screen of the (picture) display device. The light originating from the backlight in an LCD device is modulated by means of a switch or modulator, using various types of liquid crystal effects. In addition, the display may be based on electrophoretic or electromechanical effects.

The illumination system mentioned in the opening paragraph comprises a light-emitting diode (further also referred to as LED). This LED may be provided in the vicinity of or tangent to a light-transmitting edge surface of the light-emitting panel, in which case light originating from the light source is incident on the light-transmitting edge surface during operation and distributes itself in the panel. Alternatively, the illumination system comprises a plurality of LEDs, which may be distributed on the rear wall of the light-transmitting panel.

Such a system for illuminating an image display device is known from U.S. patent application US 2004/0130515. The illumination system comprises a plurality of LEDs and a light guide plate. The LEDs are arranged for direct illumination of the image display device in a regular array. The light guide plate is arranged between the regular array of LEDs and the image display device and has a plurality of recesses, each recess comprising a LED from the plurality of LEDs. The known illumination system has the disadvantage that the light-emitting window has a relatively poor uniformity throughout.

OBJECT AND SUMMARY OF THE INVENTION

It is an object of the invention to provide an illumination system having an improved uniformity.

In accordance with a first aspect of the invention, this object is achieved with an illumination system comprising:
  at least one light source for emitting light of a predominant wavelength; and
  a light-transmitting panel comprising a light-emitting window, a rear wall situated opposite said light-emitting window, and edge walls extending between the light-emitting window and the rear wall, the light-transmitting panel further comprising a light entrance window for coupling at least part of the light emitted by the light source into the light-transmitting panel, said light being transported, in operation, through the light-transmitting panel substantially via total internal reflection between the light-emitting window and the rear wall;
  the rear wall of the light-transmitting panel being provided with a two-dimensional array of recesses, a sub-set of recesses of the two-dimensional array of recesses being distributed substantially regularly on the rear wall, each recess of the sub-set of recesses comprising scattering material for coupling out light from the light-transmitting panel through the light-emitting window.

The effect of the measures according to the invention is that the light emitted by the at least one light source is coupled out from the light-transmitting panel of the illumination system via scattering material in the recesses which are distributed substantially regularly on the rear wall. The light emitted by the at least one light source is coupled into the light-transmitting panel and travels through the light-transmitting panel via total internal reflection between the light-emitting window and the rear wall. Due to confinement of the light in the light-transmitting panel, the light emitted by the at least one light source is mixed and distributed substantially uniformly in the light-transmitting panel. The sub-set of recesses is distributed substantially regularly on the rear wall, resulting in a substantially regular distribution of the scattering material on the rear wall. This substantially regular distribution of the scattering material generates a uniform distribution of the light emitted from the light-emitting window. In the known system, the plurality of light-emitting diodes (further also referred to as LEDs) is arranged in a matrix for direct illumination of the image display device. The light guide plate is arranged between the plurality of LEDs and the image display device to distribute the light on part of the area of the light guide plate. However, due to variations of emission characteristics of the LEDs in the plurality of LEDs, such as intensity and/or color variations between the emission of the LEDs, the uniformity of light emission throughout the matrix of LEDs is relatively poor, resulting in a relatively poor uniformity of the light emitted from the light guide plate to the image display device. This relatively poor uniformity is clearly visible on the image display device. A known remedy to avoid this reduction of uniformity due to emission differences of the LEDs in the matrix of LEDs is to test each LED and select LEDs that have substantially matching emission characteristics for use in a specific matrix of LEDs. This process, also commonly known as binning, is a relatively costly solution. In the illumination system according to the invention, the rear wall of the light-emitting panel comprises the sub-set of recesses, which comprise scattering material.

The recesses of the sub-set are distributed substantially regularly on the rear wall, which results in a substantially regular distribution of the scattering material on the rear wall. When light from the light-transmitting panel reaches a particular recess of the sub-set of recesses (typically after several internal reflections), the light penetrates the particular recess and is scattered by the scattering material. Subsequently, part of the scattered light will be coupled out from the light-transmitting panel and part will be re-confined in the light-transmitting panel via total internal reflection. The regular distribution of the scattering material on the rear wall improves the uniformity of the light emitted via the light-emitting window.

Use of the illumination system according to the invention has the further advantage that direct glare from the illumination system is prevented. Direct glare is a visual discomfort resulting from insufficiently shielded light sources. Especially when using the illumination system according to the invention in a general lighting system such as a luminaire, the light source of the luminaire should preferably not be directly visible or should be shielded in accordance with predefined regulations. In the illumination system according to the invention, the emitted light results from confined light from the light-transmitting panel being scattered from the light-transmitting panel through the light-emitting window. The light emitted by the at least one light source is substantially confined and mixed inside the light-transmitting panel and substantially only emitted from the light-transmitting panel via the scattering material. Due to this arrangement, the at least one light source is not directly visible when viewing the illumination system via the light-emitting window and, as such, direct glare from the illumination system is prevented.

In an embodiment of the illumination system, the scattering material comprises a luminescent material absorbing light of the predominant wavelength and emitting light of a further predominant wavelength. This embodiment has the advantage that the claimed arrangement of the luminescent material allows a relatively broad range of luminescent materials to be used in the illumination system according to the invention. Generally, luminescent materials which determine the further predominant wavelength emitted by the known illumination systems are directly applied to the light source, for example, on light-emitting diodes, or, for example, on high-pressure gas discharge lamps. However, the choice of luminescent materials to be directly applied to the light source is limited, because these materials must be able to withstand, in operation, a relatively high temperature of the light source and at the same time withstand, in operation, a relatively high light-energy flux emitted by the light source. Nevertheless, the high temperature and high light-energy flux generally result in a gradual degradation of the luminescent material, gradually reducing the efficiency of the illumination system. In the illumination system according to the invention, the luminescent material is applied away from the light source in the sub-set of recesses. This arrangement of the luminescent material reduces the requirements of the luminescent material to withstand the high temperature and the high light-energy flux, and, in addition, reduces the gradual degradation of the luminescent material.

Light of a predominant wavelength comprises light of a predefined spectral bandwidth around a center wavelength. For example, a LED emitting light of the predominant wavelength Blue emits light at the center wavelength of, for example, 470 nm, having a spectral bandwidth of, for example, 10 nm. Another example of light of a predominant wavelength from a LED is light of the predominant wavelength UV, having the central wavelength of, for example, 405 nm, and a spectral bandwidth of, for example, 5 nm. By using Red, Green and Blue, a full-color image (including white) can be generated by the illumination system, for example, when this system is applied in a display device. Also other combinations of light of predominant wavelengths may be used in the illumination system, for example, Red, Green, Blue, Cyan, Yellow and White.

In an embodiment of the illumination system, the scattering material comprises a mixture of a plurality of luminescent materials, each luminescent material absorbing light of the predominant wavelength and emitting light of a further predominant wavelength. This embodiment has the advantage that a mixture of luminescent materials can be chosen so that a sum of the different further predominant wavelengths of the different luminescent materials covers a major part of the visible electromagnetic spectrum, resulting in an illumination system having a relatively high color-rendering index. This embodiment is especially beneficial in general illumination applications in which a relatively high color-rendering index is generally required to obtain a true reproduction of a color of an object when illuminated by the illumination system.

An embodiment of the illumination system further comprises a beam-shaping element arranged substantially parallel to the light-emitting window for generating a predefined angular distribution of the light emitted from the light-transmitting panel. The predefined angular distribution can be adapted, for example, by using the beam-shaping element to match the angular distribution required in a general lighting system such as a luminaire. In a luminaire, the light emitted from the luminaire must be shielded in accordance with predefined regulations, for example, for reducing glare from the luminaire. For example, the predefined regulations prescribe the angular distribution of the light emitted from the luminaire to be limited to within, for example, 60° from an axis arranged perpendicularly to the light-emitting window. The beam-shaping elements may be, for example, an array of lenticular elements or, for example, an array of Fresnel-lens elements. The lenticular elements or Fresnel-lens elements are arranged, for example, in an array which is complementary to the two-dimensional array of recesses.

In an embodiment of the illumination system, substantially each recess in the array of recesses is constituted by an emission wall and a side wall extending between the emission wall and the rear wall, the emission wall being arranged substantially parallel to the light-emitting window. Generally, the form and the dimensions of the emission wall together with the side wall contribute to the emission characteristic of the light-emitting panel.

In an embodiment of the illumination system, the emission wall and the side wall of the recess are arranged substantially perpendicularly. Light, which is scattered from the scattering material through the emission wall, will generally be emitted by the light-transmitting panel via the light-emitting window, and light which is scattered from the scattering material through the side walls will generally be re-confined in the light-transmitting panel. The substantially perpendicular arrangement of the emission wall and the side walls results in a clear separation of the light from the scattering material which is emitted by the light-emitting panel and the light from the scattering material which is confined inside the light-emitting panel.

In an embodiment of the illumination system, the light source is constituted by a plurality of light-emitting diodes and a plurality of light entrance windows, wherein the plurality of light-emitting diodes is arranged in a further sub-set of further recesses of the two-dimensional array of recesses, the further recesses constituting the plurality of light entrance windows. This embodiment has the advantage that a single substrate arranged parallel to the rear wall can be used for mounting the light-emitting diodes and for applying the scattering material. This simplifies the construction of the illumination system and typically reduces production costs. This embodiment has the further advantage that the light emitted by the plurality of LEDs is mixed inside the light-transmitting panel and distributed substantially uniformly in the light-transmitting panel. The light from the LEDs is coupled out via the scattering material in the sub-set of recesses. Differences or variations of emitted intensity and/or color between the different LEDs are mixed inside the light-transmitting panel, which improves the uniformity of the light emitted by the light-transmitting panel and precludes the need for binning the LEDs.

In an embodiment of the illumination system, the plurality of light-emitting diodes are side-emitting light-emitting diodes arranged in the further sub-set of further recesses, the side-emitting light-emitting diodes being arranged to emit light, in operation, substantially parallel to the light-emitting window. Use of side-emitting LEDs has the advantage that the further recesses may be identical to the recesses comprising scattering material. Use of LEDs other than side-emitting LEDs generally requires the further recesses to include arrangements ensuring that the light from the LEDs is coupled into the light-transmitting panel, such that the in-coupled light is subsequently transported through the light-transmitting panel via total internal reflection. Such arrangements may include, for example, a specific shape of an emission wall of the further recesses of the further sub-set. Use of side-emitting LEDs allows both the recesses comprising scattering material and the further recesses to be identical, resulting in a simplification of the light-transmitting panel and typically a reduction of production costs.

In an embodiment of the illumination system, the further recesses of the further sub-set are mixed with the recesses of the sub-set, the mix of recesses and further recesses being distributed substantially regularly on the rear wall. This embodiment has the advantage that the LEDs are regularly distributed on the rear wall, thus allowing easier cooling of the LEDs. Furthermore, in the embodiment in which both the recesses comprising scattering material and the further recesses are identical, the distribution of the LEDs and of the scattering material in the two-dimensional array of recesses can be easily adapted without changing the light-transmitting panel. This allows easy alteration of the emission characteristic of the light-transmitting panel.

The invention also relates to a luminaire and a display device comprising the illumination system according to the invention.

BRIEF DESCRIPTION OF THE DRAWINGS

These and other aspects of the invention are apparent from and will be elucidated with reference to the embodiments described hereinafter.

In the drawings:

FIG. 5A shows a luminaire comprising the illumination system according to the invention, and FIG. 5B shows a display device comprising the illumination system according to the invention.

The Figures are purely diagrammatic and not drawn to scale. Particularly for clarity, some dimensions are exaggerated strongly. Similar components in the Figures are denoted by the same reference numerals as much as possible.

DESCRIPTION OF EMBODIMENTS

Figure 1A:
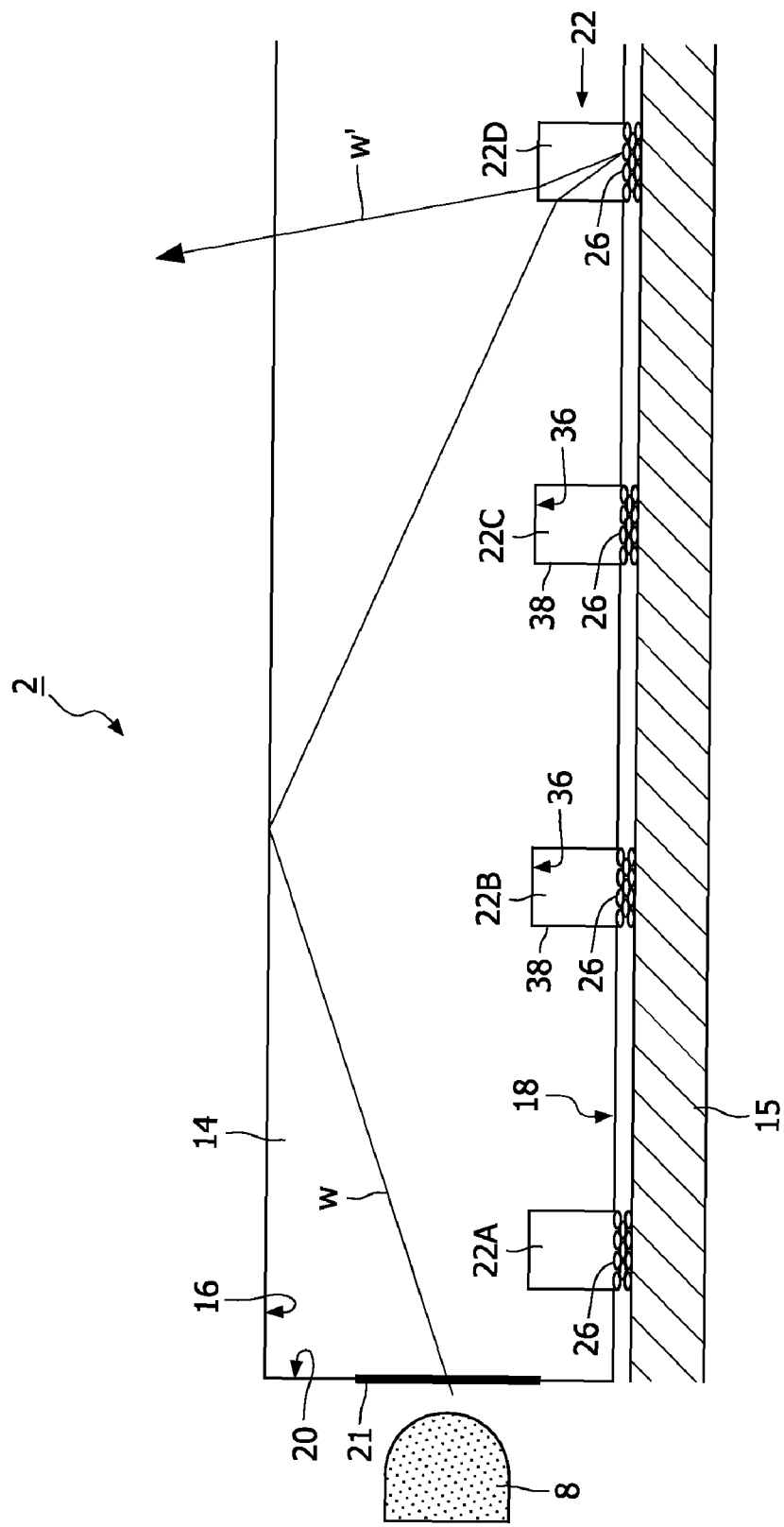
FIGS. 1A and 1B are cross-sectional views of an illumination system according to the invention.
Figure 1B:
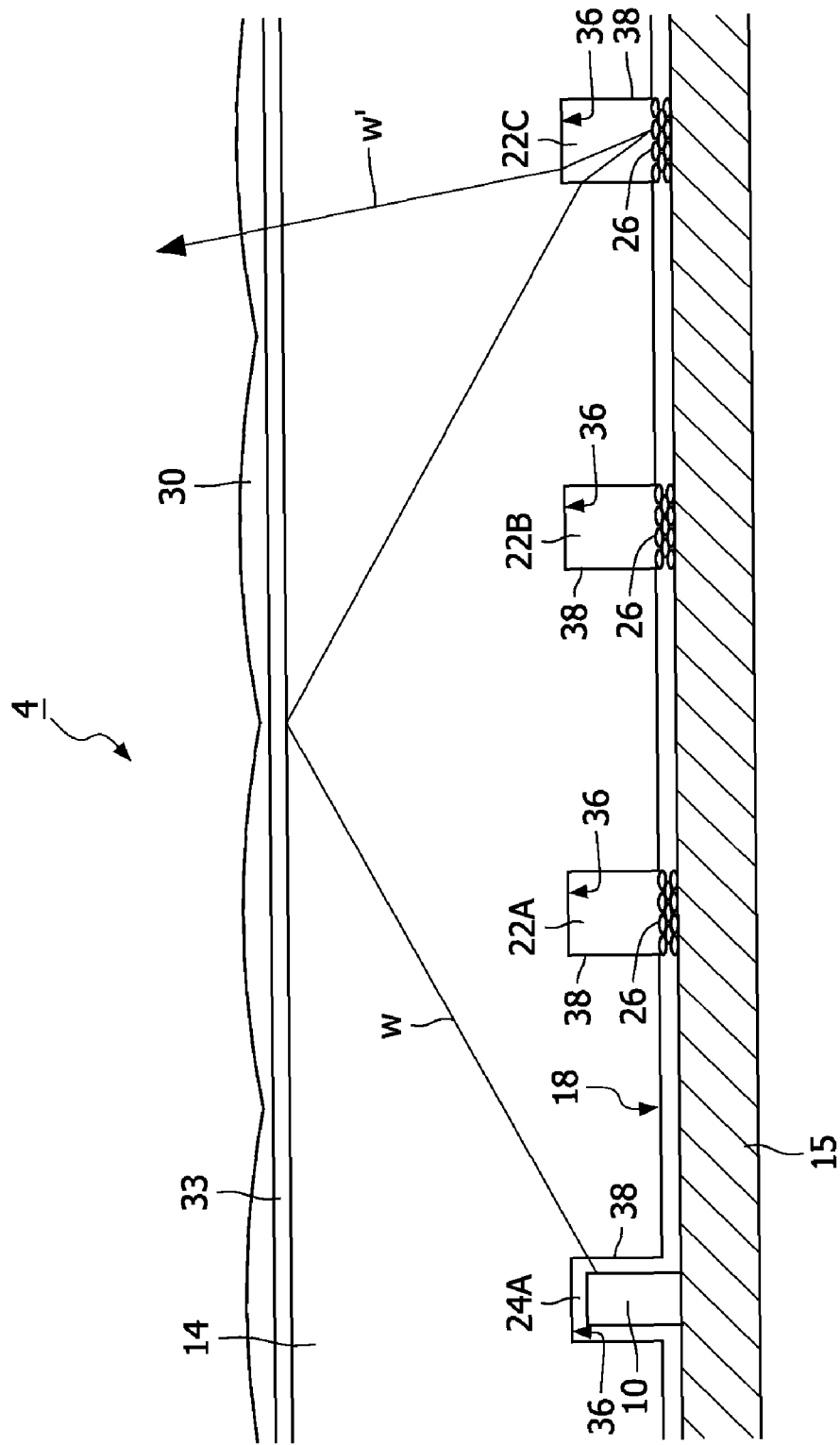

FIGS. 1A and 1B are cross-sectional views of an illumination system 2, 4 according to the invention. The illumination system 2, 4 comprises at least one light source, for example, a light-emitting diode 8, 10 (further also referred to as LED) for emitting light of a predominant wavelength R, G, B, UV, W, for example, the predominant wavelength White W (see FIG. 1A) or, for example, the predominant wavelength Ultraviolet UV (see FIG. 2). The illumination system 2, 4 further comprises a light-transmitting panel 14 which comprises a light-emitting window 16, a rear wall 18 situated opposite said light-emitting window 16, and edge walls 20 extending between the light-emitting window 16 and the rear wall 18. The light-transmitting panel 14 is arranged to couple at least part of the light W emitted by the LED 8, 10 into the light-transmitting panel 14. This can be done, for example, via the edge wall 20 comprising, for example, a light entrance window 21 (see FIG. 1A) or, for example, via a side wall 38 of a further recess 24 (see FIG. 1B). The light W in the light-transmitting panel 14 is transported substantially via total internal reflection between the light-emitting window 16 and the rear wall 18. The rear wall 18 is provided with a two-dimensional array (see FIG. 1C) of recesses 22, 24. A sub-set of recesses 22 is distributed substantially regularly on the rear wall 18. Each recess 22A, 22B, 22C, 22D of the sub-set 22 comprises scattering material 26, for example, particles of titanium oxide ($TiO_2$), or aluminum oxide ($Al_2O_3$), or tantalum oxide ($Ta_2O_5$), for coupling out the light W from the light-transmitting panel 14 through the light-emitting window 16. When light W from the light-transmitting panel 14 reaches a particular recess 22A, 22B, 22C, 22D of the sub-set of recesses 22, the light W penetrates the particular recess 22A, 22B, 22C, 22D and is scattered by the scattering material 26. Subsequently, part of the scattered light W' will be coupled out from the light-transmitting panel 14 and part will be re-confined in the light-transmitting panel 14 via total internal reflection. The regular distribution of the scattering material 26 on the rear wall 18 improves the uniformity of the light W' emitted via the light-emitting window 16.

Each recess 22A, 22B, 22C, 22D, 24A, 24B (see FIGS. 2 and 3) in the two-dimensional array of recesses 22, 24 comprises an emission wall 36 and a side wall 38 arranged between the emission wall 36 and the rear wall 18. The light W' scattered away from the recess 22A, 22B, 22C, 22D via the emission wall 36 will generally be emitted by the light-transmitting panel 14, and light W' scattered away from the recess 22A, 22B, 22C, 22D via the side wall 38 is typically re-confined in the light-transmitting panel 14 and will generally be coupled out of the light-transmitting panel 14 via a subsequent recess 22A, 22B, 22C, 22D of the sub-set of recesses 22. This results in a clear separation of that part of the scattered light W' which is emitted by the light-transmitting panel 14 and that part of the scattered light W' which is re-confined inside the light-transmitting panel 14.

FIGS. 1A and 1B show a substrate 15 on which, for example, the scattering material 26 is applied. Alternatively, the scattering material may be deposited in the recesses 22A, 22B, 22C, 22D of the sub-set of recesses 22. The LED 10 may also be applied, for example, on the substrate 15, in which case the substrate 15 preferably comprises electric contacts (not shown) to supply power to the LED 10. The substrate 15 may be a flex-foil or a printed circuit board and is preferably at least partially spectrally reflective to recycle the light that is scattered by the scattering material 26 in the direction of the substrate 15 back towards the light-emitting window 16.

Light of a predominant wavelength R, G, B, UV, W comprises light of a predefined spectral bandwidth around a center wavelength. For example, a LED 8, 10 emitting light of the predominant wavelength Blue B (not shown) emits light at the center wavelength of, for example, 470 nm, having a spectral bandwidth of, for example, 10 nm. Another example of light of a predominant wavelength from a LED 8, 10 is light of the predominant wavelength UV (see FIG. 2) having the central wavelength of, for example, 405 nm, and a spectral bandwidth of, for example, 5 nm. By using Red R (not shown), Green G (not shown) and Blue B, a full-color image (including white) can be generated by the illumination system 2, 4, for example, when the illumination system 2, 4 is applied in a display device 50 (see FIG. 5). Also other combinations of light of predominant wavelengths R, G, B, UV, W may be used in the illumination system 2, 4, for example, Red R, Green G, Blue B, Cyan C (not shown), Yellow Y (not shown) and White W.

FIG. 1A shows an embodiment of the illumination system 2, in which the LED 8 is arranged at the edge wall 20 of the light-transmitting panel 14. The edge wall 20 comprises, for example, the light entrance window 21 for coupling in the light W emitted by the LED 8. Generally, the remainder of the edge wall 20 of the light-transmitting panel 14 is reflective to confine the light W inside the light-transmitting panel 14. FIG. 1A shows a beam of light W emitted by the LED 8. This beam of light W is reflected from the light-emitting window 16 via total internal reflection and, after reflection, reaches one particular recess 22A, 22B, 22C, 22D of the sub-set of recesses 22 and enters this particular recess 22A, 22B, 22C, 22D. The light W reaches the scattering material 26 in the particular recess 22A, 22B, 22C, 22D which scatters the light W, changing a direction of propagation of the light beam W, for example, into the light beam W'. The scattered light beam W' is emitted via the emission wall 36 of the particular recess 22A, 22B, 22C, 22D, via the light-emitting window 16, away from the light-transmitting panel 14.

FIG. 1B shows an embodiment of the illumination system 4 which comprises at least one side-emitting LED 10 arranged in a further sub-set of further recesses 24. The illumination system 4 preferably comprises a plurality of side-emitting LEDs (see FIG. 1C) arranged in the further recesses 24A, 24B of the further sub-set 24, regularly distributed between the sub-set of recesses 22. The side-emitting LEDs emit light substantially parallel to the light-emitting window 16 via the side wall 38 of a further recess 24A, 24B. This arrangement of side-emitting LEDs 10 allows effective coupling of the light W emitted by the side-emitting LED into the light-transmitting panel 14, such that the light inside the light-transmitting panel 14 is transported via total internal reflection. FIG. 1B again shows a beam of light W emitted by the LED 10. This beam of light W is reflected from the light-emitting window 16 via total internal reflection and enters the particular recess 22A, 22B, 22C, 22D. The light W is scattered by the scattering material 26 in the particular recess 22A, 22B, 22C, 22D. The scattered light beam W' is emitted via the emission wall 36 of the recess 22A, 22B, 22C, 22D, via the light-emitting window 16 and via a beam-shaping element 30, away from the light-transmitting panel 14.

The illumination system 2, 4 according to the invention shown in FIG. 1B comprises the beam-shaping element 30. The beam-shaping element 30 is preferably arranged substantially parallel to the light-emitting window 16 of the light-transmitting panel 14. In FIG. 1B, a small gap 33 is arranged between the beam-shaping element 30 and the light-transmitting panel 14. The gap 33 may be filled, for example, with air or with a material having a specific refractive index, which ensures that the light W inside the light-transmitting panel 14 is substantially confined via total internal reflection. Alternatively, the beam-shaping element 30 is constituted by a material having the specific refractive index, in which case the gap 33 shown in FIGS. 1A and 1B may be omitted and the beam-shaping element 30 may be directly applied to the light-emitting window 16. The beam-shaping element 30 generates a predefined angular distribution 32 (see FIG. 4) of the light W' which is emitted from the light-transmitting panel 14. The predefined angular distribution 32, for example, matches the angular distribution 32 required in a general lighting system such as a luminaire 40 (see FIG. 5). In a luminaire 40, the light W' emitted from the luminaire 40 must be shielded in accordance with predefined regulations, for example, for reducing glare from the luminaire 40. For example, the predefined regulations prescribe the angular distribution 32 of the light emitted from the luminaire 40 to be limited to within, for example, 60° from an axis 34 (see FIG. 4) arranged perpendicularly to the light-emitting window 16. The beam-shaping element 30 may be, for example an array of lenticular elements 30 or, for example, an array of Fresnel-lens elements (not shown). The lenticular elements 30 or Fresnel-lens elements are arranged, for example, in an array complementary to the sub-set of recesses 22 (see FIG. 1C). Alternatively, the emission wall 36 of the recesses 22A, 22B, 22C, 22D may be convex (not shown) or concave (not shown) so as to constitute a further beam-shaping element.

In an embodiment of the illumination system 4, the sub-set of recesses 22 and the further sub-set of further recesses 24 are identical recesses 22A, 22B, 22C, 22D, 24A, 24B. This embodiment has the advantage that the production of the light-transmitting panel is simplified. It has the further advantage that the distribution of the recesses 22A, 22B, 22C, 22D and the further recesses 24A, 24B can be easily changed without changing the light-transmitting panel 14, for example, by changing the distribution of the LEDs 10 and/or scattering material 26 on the substrate 15. Changing the distribution of the recesses 22A, 22B, 22C, 22D and the further recesses 24A, 24B, for example, changes a light emission characteristic of the illumination system 2, 4.

Alternatively, the illumination system 2, 4 according to the invention comprises LEDs arranged both at the edge wall 20 and in the further sub-set of recesses 24.

Figure 1C:
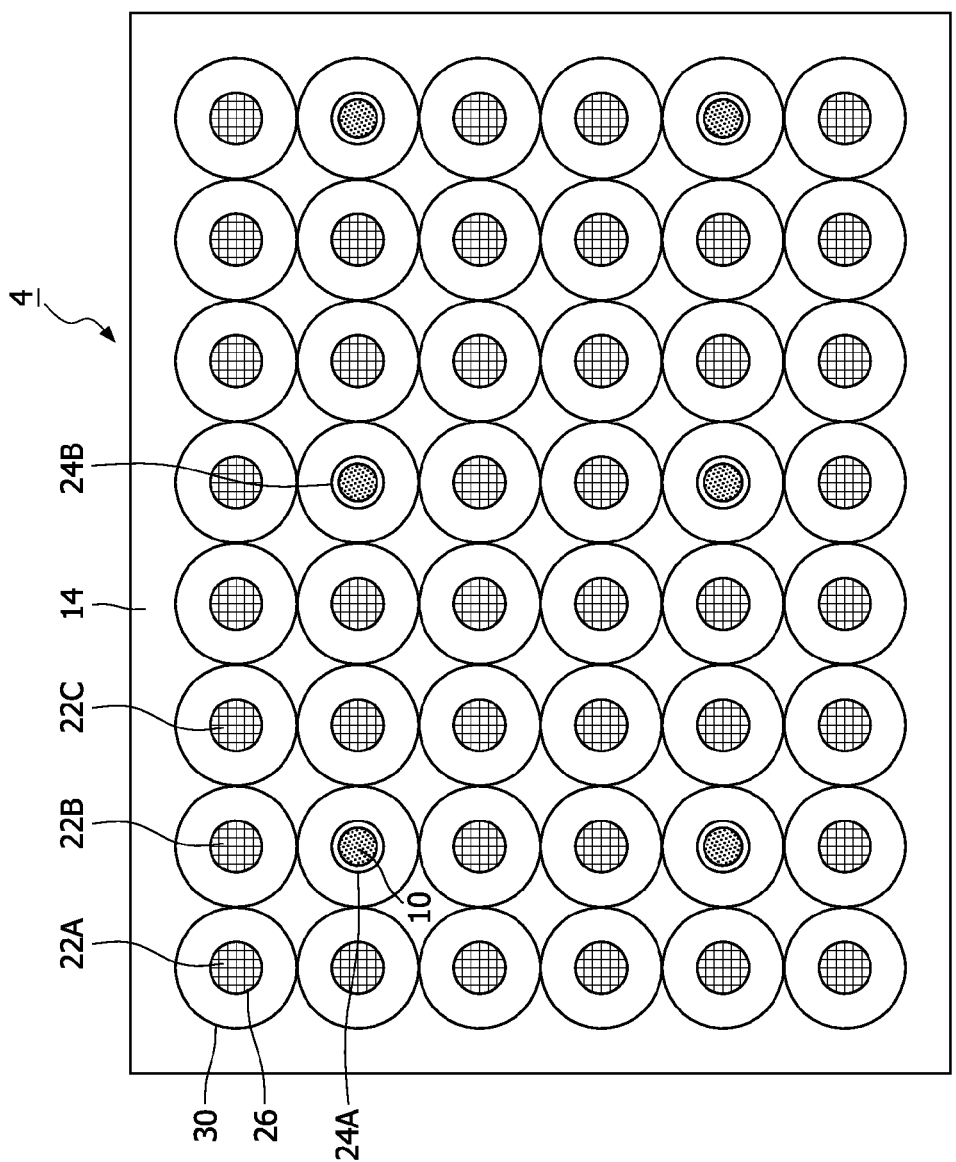
FIG. 1C is a top view of an illumination system according to the invention.

FIG. 1C is a top view of an illumination system 4 according to the invention. The sub-sets of recesses 22 comprising the scattering material 26 are distributed substantially regularly across the light-transmitting panel 14. Mixed between the recesses 22A, 22B, 22C, 22D comprising the scattering material 26 is a plurality of further recesses 24A, 24B of the further sub-set 24, each comprising a side-emitting LED 10 emitting light substantially parallel to the light-emitting window 16 into the light-transmitting panel 14. FIG. 1C further shows the beam-shaping element 30 constituted by, for example, an array of lenticular elements 30 arranged in an array complementary to the two-dimensional array of recesses 22, 24.

Figure 2:
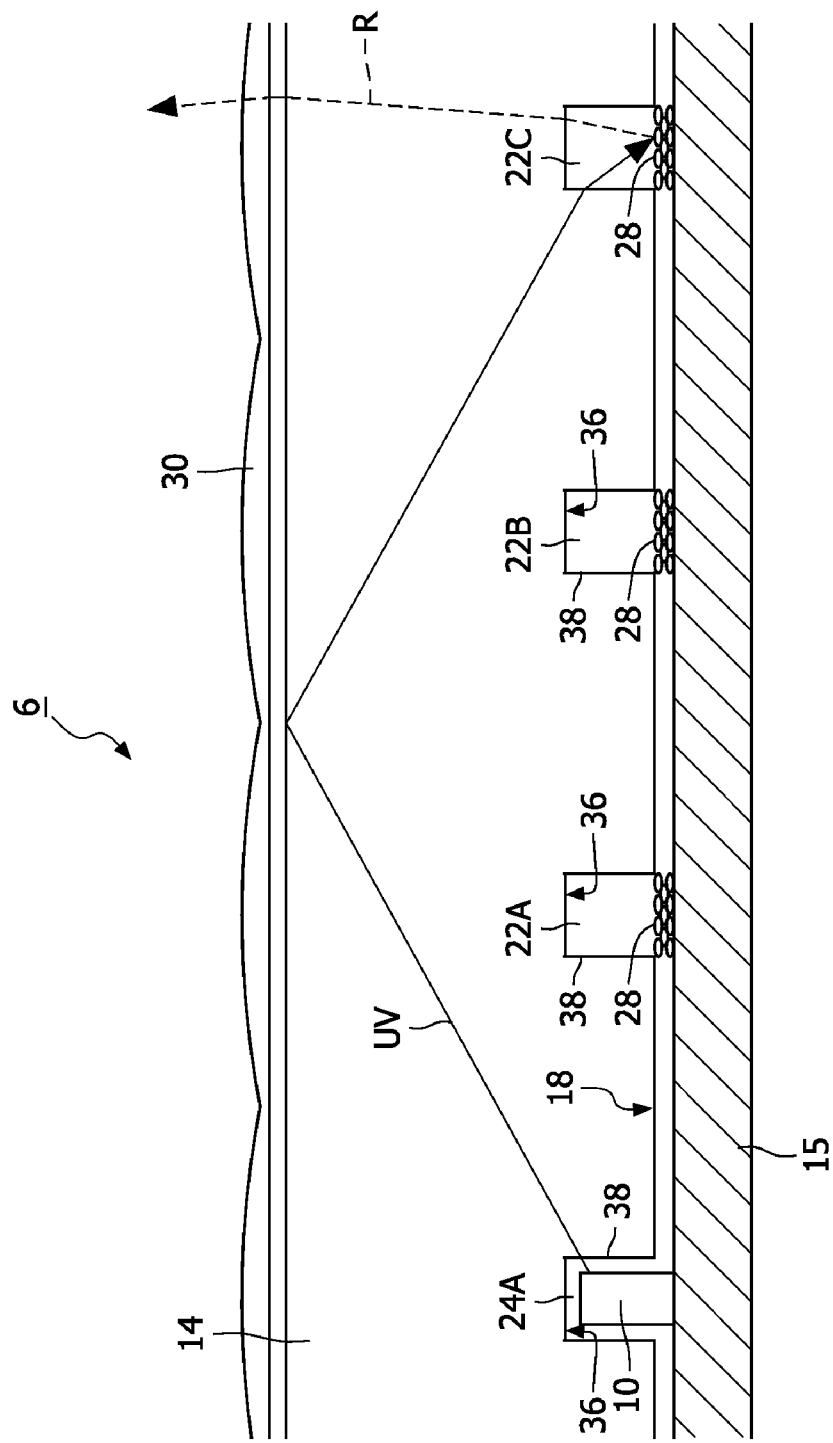
FIG. 2 is a cross-sectional view of a further embodiment of the illumination system according to the invention.

FIG. 2 is a cross-sectional view of a further embodiment of the illumination system 6 according to the invention. In the embodiment shown in FIG. 2, the illumination system 6 comprises a plurality of LEDs arranged in the further sub-set of further recesses 24 mixed with the sub-set of recesses 22, identical to the illumination system 4 shown in FIGS. 1B and 1C. The LEDs 10 arranged in the further recesses 24A, 24B are preferably side-emitting LEDs 10 emitting light of the predominant wavelength, for example, Ultraviolet UV. The recesses 22A, 22B, 22C, 22D comprise a luminescent material 28 which, for example, absorbs the light of the predominant wavelength Ultraviolet UV and emits light of a further predominant wavelength, for example, Red R (indicated by a broken line in FIG. 2).

In known illumination systems, luminescent material is directly applied to LEDs so as to change the predominant wavelength emitted by a LED into a further predominant wavelength. This luminescent material must be able to withstand, in operation, a relatively high temperature of the LED, and at the same time withstand, in operation, a relatively high light-energy flux emitted by the LED. In the illumination system 2, 4, 6 according to the invention shown in FIG. 2, the luminescent material 28 is arranged in the recesses 22A, 22B, 22C, 22D of the sub-set of recesses 22. The luminescent material 28 absorbs light of the predominant wavelength Ultraviolet UV and emits light of the further predominant wavelength Red R. The luminescent material 28 is located remotely from the LEDs 10, which relaxes the need for the luminescent material 28 to withstand a relatively high temperature and a relatively high light-energy flux. Because of these relaxed temperature and light-energy flux requirements, an increased range of different luminescent materials 28 may be used in the arrangement shown in FIG. 2. Furthermore, a relatively high temperature and a relatively high light-energy flux generally result in a gradual degradation of the luminescent material 28. The arrangement shown in FIG. 2 reduces the gradual degradation of the luminescent material 28, increasing the lifetime of the illumination system 8.

When using a plurality of LEDs 8, 10, the illumination system 2, 4, 6 according to the invention mixes the light W, UV emitted by the plurality of LEDs 8, 10 inside the light-transmitting panel 14. This mixing of light W, UV in the light-transmitting panel 14 has the advantage that differences between the LEDs 8, 10 in the plurality of LEDs 8, 10 are substantially not visible, thus precluding the need for binning the LEDs 8, 10. Furthermore, due to mixing of the light W, UV, the emission of the light W', R over the light-emitting window 16 remains substantially uniform, even when, for example, one of the LEDs 8, 10 in the plurality of LEDs 8, 10 fails. The uniformity of the light W', R emitted by the light-transmitting panel 14 is mainly determined by the distribution of the sub-set of recesses 22 comprising the scattering material 26 or the luminescent material 28, and is determined by a uniform distribution of the scattering material 26 or luminescent material 28 in each recess 22A, 22B, 22C, 22D. For example, the scattering material 26 or luminescent material 28 can be applied substantially uniformly by using well-known methods such as screen printing, inkjet printing or electrophoretic coating.

FIGS. 3A, 3B, 3C and 3D are cross-sectional views (FIGS. 3A and 3C) and top views (FIGS. 3B and 3D) of one further recess 24A of the further sub-set of further recesses 24 arranged in the light-transmitting panel 14 comprising a LED 10.

Figure 3A:
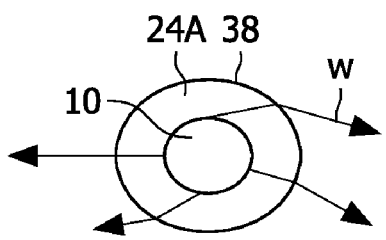
FIGS. 3A, 3B, 3C and 3D are cross-sectional views and top views of a further recess arranged in the light-transmitting panel comprising a light-emitting diode.
Figure 3B:
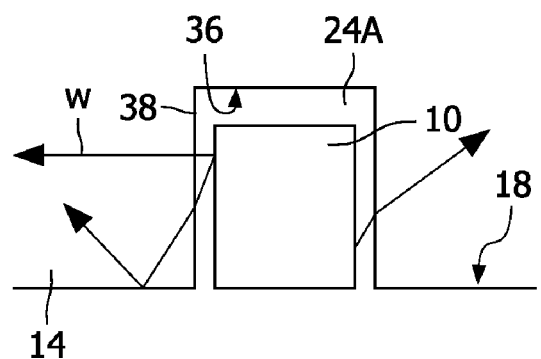

In FIGS. 3A and 3B, the further recess 24A is a cylindrically shaped further recess 24A comprising the side-emitting LED 10. The side wall 38 is arranged substantially perpendicularly to the emission wall 36 of the further recess 24A. In the embodiment shown in FIGS. 3A and 3B, the side-emitting LED 10 emits light W substantially in all directions parallel to the light-emitting window 16 of the light-transmitting panel 14. Substantially the only light passing from the further recess 24A into the light-transmitting panel 14 via the emission wall 36 is stray light, resulting, for example, from reflections inside the further recess 24A.

Figure 3C:
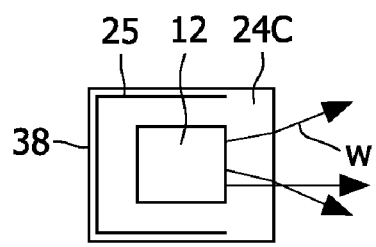
Figure 3D:
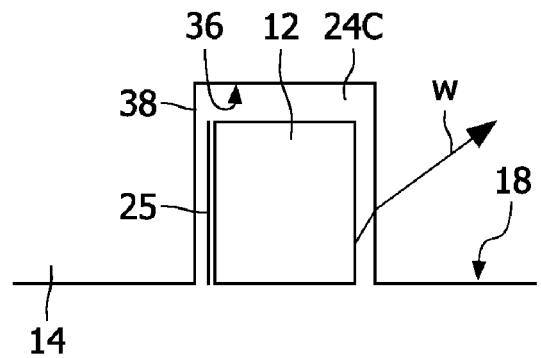

In FIGS. 3C and 3D, the further recess 24A is a cube-shaped further recess 24A comprising the side-emitting LED 12. The side-emitting LED 12 emits light W substantially in one direction parallel to the light-emitting window 16 of the light-transmitting panel 14. A further recess 24C comprising a side-emitting LED 12 which substantially emits light only in one direction preferably comprises a reflecting surface 25 at the sides of the cube-shaped further recess 24C which is not used for emitting light into the light-transmitting panel 14. The reflecting surface 25 may be, for example, a reflective foil 25 (for instance, aluminum or ESR-foil), or a reflective layer (for instance, a layer of aluminum, silver, or gold) deposited into the hole so that one side of the cube-shaped further recess 24C is not covered to allow emission of the light from the cube-shaped further recess 24C.

Figure 4:
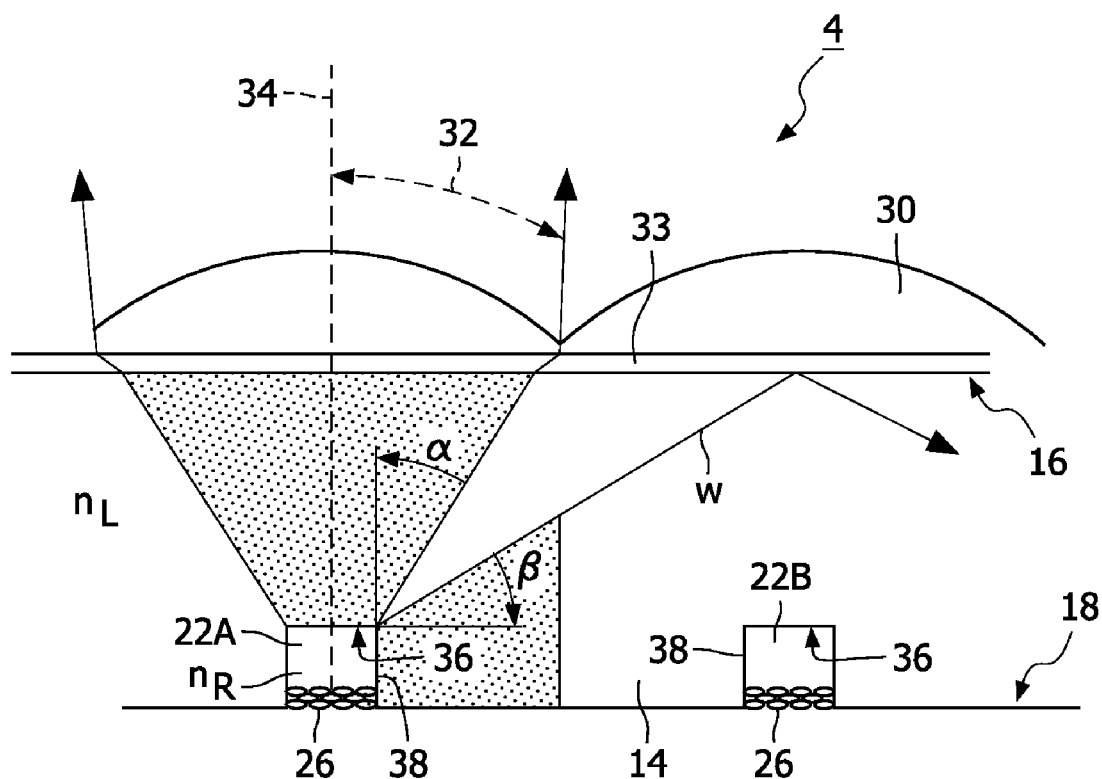
FIG. 4 is a cross-sectional view of the illumination system, illustrating which part of the scattered light is emitted and which part of the scattered light is re-confined in the light-transmitting panel.

FIG. 4 is a cross-sectional view of the illumination system 4, illustrating which part of the scattered light W' is emitted and which part of the scattered light is re-confined in the light-transmitting panel 14. The dotted areas illustrate where light is emitted from the recess 22A, 22B, 22C, 22D, either from the emission wall 36 or from the side wall 38. The dotted areas are defined by angles $\alpha$ and $\beta$ which are determined by a combination of a refractive index of the light-transmitting panel 14 and a refractive index inside the recess 22A, 22B, 22C, 22D. In an embodiment in which the scattering material 26 is arranged in air (refractive index inside the recess 22A, 22B, 22C, 22D is substantially equal to one: $n_R=1.0$) and in which the light-transmitting panel is constituted by, for example, glass (having a refractive index of approximately 1.5: $n_L=1.5$), the angles $\alpha$ and $\beta$ are approximately 42°. As a result, substantially all light W emitted from the recess 22A, 22B, 22C, 22D via the side wall 38 is confined in the light-transmitting panel 14 via total internal reflection. Furthermore, substantially all light W' emitted from the recess 22A, 22B, 22C, 22D via the emission wall 36 is emitted by the light-transmitting panel 14 via the light-emitting window 16. The illumination system 4 shown in FIG. 4 further comprises a beam-shaping element 30, which determines the angular distribution 32 of the light emitted by the illumination system 4. In a luminaire 40 (see FIG. 5), the light emitted from the luminaire 40 must be shielded in accordance with predefined regulations, for example, for reducing glare from the luminaire 40. For example, the predefined regulations prescribe that the angular distribution 32 of the light emitted from the luminaire 40 must be within, for example, 60° from an axis 34 arranged perpendicularly to the light-emitting window 16. The beam-shaping element 30 is, for example, arranged to obtain this angular distribution 32. The beam-shaping element 30 may be, for example, an array of lenticular elements. The pitch of the lenticular elements is preferably chosen to be such that all light emitted from a single recess 22A, 22B, 22C, 22D is captured by a single lenticular element.

FIG. 5A is a schematic representation of a luminaire 40 comprising the illumination system 4 according to the invention. A luminaire is a complete lighting unit, for example, used in offices, shops, at home, or used, for example, as lighting unit for street lights. The angular distribution 32 (see FIG. 4) of the light emitted from the luminaire 40 must be generally limited to avoid glare, which can be influenced by using the beam-shaping element 30. However, the color-rendering index should be preferably as high as possible so that the illumination of an object (not shown) by the luminaire 40 results in a true reproduction of the color of the object. This high color-rendering index can be obtained by using, for example, a broad mixture of different luminescent materials 28, together emitting light substantially covering the full visible electromagnetic spectrum.

FIG. 5B is a schematic representation of a display device 50 comprising the illumination system 4 according to the invention. The display device 50 typically comprises a non-emissive display 52, such as an array of liquid crystal cells which, by varying the transmission of cells in the array of liquid crystal cells, is able to create an image on the display 52. The illumination system 4 is used as a backlighting system. The requirements regarding the angular distribution of the emitted light and the color-rendering index of the emitted light are typically different as compared with the luminaire 40. Both can be adapted by using, for example, the beam-shaping element 30, and a mixture of luminescent material 28 or a mixture of different LEDs, respectively.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system, comprising:
a substrate providing electrical connectivity to a plurality of side emitting LEDs mounted on said substrate;
a light transmitting panel having a plurality of recesses, said plurality of recesses formed along a rear wail, said light transmitting panel fixedly mounted over said substrate;
said recesses forming a set of light scattering recesses and a set of light emitting recesses wherein each of said light scattering recesses having a top wall forming a light emitting wall and a side wall extending downward from said top wall to said rear wall;
each of said light scattering recesses surrounding light scattering material positioned over said substrate which receives light from at least one of said LEDs and transmits scattered light through said correlated light emitting wail and outward through said light transmitting panel;
wherein each of said light emitting recesses is surrounded by a plurality of said light scattering recesses;
each of said light emitting recessed further substantially surrounding one of said side emitting LEDs mounted on said substrate;
and further wherein each of said recesses are substantially cylindrical.

2. An illumination system as claimed in claim 1, wherein the scattering material comprises at least one luminescent material.

3. An illumination system as claimed in claim 1 further comprising a beam-shaping element arranged substantially parallel to the light-emitting window for generating a pre-defined angular distribution of the light emitted from the light-transmitting panel.

4. An illumination system as claimed in claim 1, wherein the emission wall and the side wall of said recesses are arranged substantially perpendicularly.

5. An illumination system as claimed in claim 1, wherein the plurality of light-emitting diodes are side-emitting light-emitting diodes arranged to emit light, in operation, substantially parallel to the light-emitting window.

* * * * *